United States Patent Office 2,768,213
Patented Oct. 23, 1956

2,768,213

1,2,6-HEXANETRIOL

Richard R. Whetstone and Seaver A. Ballard, Orinda, Calif., assignors to Shell Development Company, Emeryville, Calif., a corporation of Delaware No Drawing. Application April 13, 1953,
Serial No. 348,592

3 Claims. (Cl. 260—635)

This invention pertains to a new trihydric alcohol. More particularly, the invention pertains to the new and useful trihydric alcohol 1,2,6-hexanetriol.

This application is a continuation-in-part of our prior copending application Serial No. 694,144, filed August 30, 1946, now U. S. Patent No. 2,639,297, issued May 19, 1953.

Despite the fact that glycerine now is abundantly available and occupies in chemical industry a position that is virtually that of a basic raw material, there has been need for a trihydric alcohol which can be prepared in large quantities at low cost and can be employed satisfactorily in place of glycerine. This is due in large part to the fact that the available sources of natural glycerine are limited and even at the present time have been insufficient upon occasion to meet the demands for glycerine at the required low price. Although synthetic glycerine currently is being manufactured by synthesis from propylene, of which there is an abundant supply from petroleum sources, the synthesis is complex and requires inordinately complex and costly facilities. Also, the only known method of synthesizing glycerine that has been employed on a commercial scale requires use of large quantities of chlorine, an aspect of the method which is not without its distinctly undesirable aspects.

Pentaerythritol has been manufactured on a limited scale in an attempt to supplement the supply of polyhydric alcohols that are useful as glycerine is useful. However, pentaerythritol has not been found to be entirely satisfactory for the purpose. And since it is a tetrahydric alcohol it is distinctly different from glycerine for many purposes.

1,2,6-hexanetriol, the new trihydric alcohol of our invention, has been found to have such properties that for many purposes it can be employed equivalently to and in lieu of glycerine. In addition to this desirable feature, 1,2,6-hexanetriol has been found to have other and unexpected properties that make it superior both to glycerine and to trihydric alcohols which on the basis of their chemical structures are even more closely related to 1,2,6-hexanetriol than is glycerine. Of equal and perhaps even greater importance is the fact that 1,2,6-hexanetriol can be prepared from such an abundantly available starting material as propylene by a series of simple chemical reactions that offers material advantages over the costly method presently employed for the commercial production of synthetic glycerine.

For preparing 1,2,6-hexanetriol from propylene there may be employed a sequence of chemical conversions comprising (1) partial oxidation of propylene to acrolein; (2) thermal treatment of the acrolein to yield acrolein dimer; and (3) conversion of the acrolein dimer, by reduction and hydrolysis, in either order or simultaneously, to yield the desired 1,2,6-hexanetriol. Avoidance of necessity to use chlorine, need for only propylene, oxygen, and hydrogen as raw materials, and simplicity of the individual steps will be seen to be among the advantages of the method by which the new trihydric alcohol of our invention can be prepared.

For partial oxidation of propylene to produce acrolein, the oxidation may be carried out in the vapor phase over a catalyst, such as a copper oxide catalyst or a metal selenite catalyst. A suitable method for conducting the partial oxidation of propylene to acrolein over a copper oxide catalyst is the method disclosed in the Hearne and Adams patent, U. S. 2,451,485, issued October 19, 1948. A method for conducting the partial oxidation of propylene to acrolein over a metal selenite catalyst is disclosed in the Clark and Shutt patent, U. S. 2,383,711, issued August 28, 1945. The conversion of propylene to acrolein can be described by the following chemical equation:

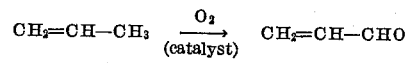

By a thermal treatment of the acrolein, the acrolein then is converted to acrolein dimer, 3,4-dihydro-1,2-pyran-2-carboxaldehyde. The thermal treatment of the acrolein desirably is carried out by the continuous process described in U. S. Patent No. 2,479,284, issued to one of the present applicants on August 16, 1949. The formation of acrolein dimer from acrolein can be represented by the following chemical equation:

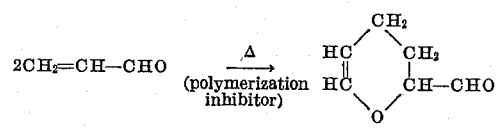

According to one method of synthesizing 1,2,6-hexanetriol, the acrolein dimer may be reduced to the corresponding unsaturated heterocyclic alcohol, 3,4-dihydro-1,2-pyran-2-methanol, this intermediate may be hydrolyzed to yield 5,6-dihydroxyhexanal, and by a further reduction the 5,6-dihydroxyhexanal converted to 1,2,6-hexanetriol. The reduction of the acrolein dimer may be carried out directly, as by selective hydrogenation over a cadmium-containing catalyst or by use of the Meerwein-Pondorf method for reducing aldehydes, as by treatment with a substantially stoichiometric amount of aluminum butoxide in butyl alcohol, or it may be carried out indirectly by means of the Tistschenko dismutation of aldehydes and subsequent saponification of the resulting 3,4-dihydro-1,2-pyran-2-methyl 3,4-dihydro-1,2-pyran-2-carboxylate to yield 3,4-dihydro-1,2-pyran-2-methanol. Hydrolysis of 3,4-dihydro-1,2-pyran-2-methanol to 5,6-dihydroxyhexanal can be brought about by heating the 3,4-dihydro-1,2-pyran-2-methanol, say at 50° C., with weakly acidulated water or, at somewhat higher temperature, by heating with water alone. The reduction of the 5,6-dihydroxyhexanal may be carried out by treatment of the 5,6-dihydroxyhexanal or an aqueous solution of 5,6-dihydroxyhexanal with molecular hydrogen at hydrogenating conditions of elevated temperatures and superatmospheric pressures over a Raney nickel, a copper chromite, or other hydrogenating catalyst. The reactions thus involved can be represented as follows:

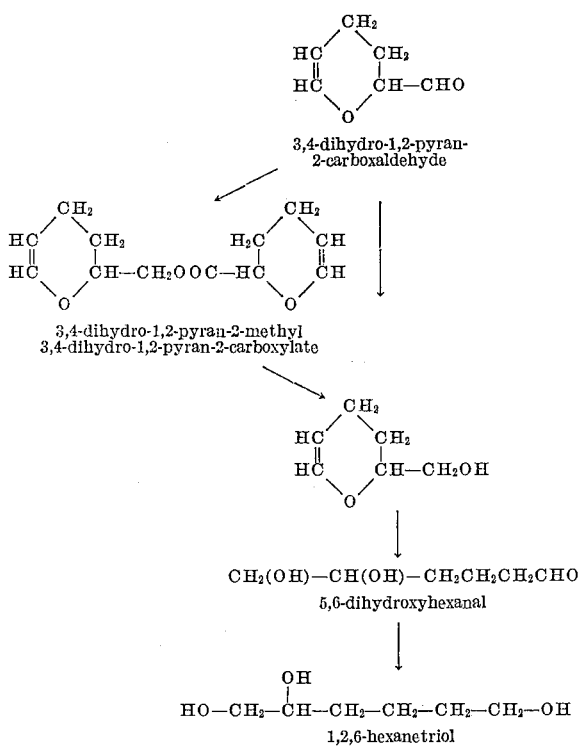

More simply, the acrolein dimer can be subjected directly to a hydrolysis treatment according to the method disclosed and claimed in our aforesaid copending application Serial No. 694,144 (to which reference is hereby made), whereby there is obtained 2-hydroxy-1,6-hexanedial (alpha-hydroxyadipaldehyde) in the form of an aqueous solution thereof, and the 2-hydroxy-1,6-hexanedial then may be reduced by treatment of the aqueous solution in the presence of a nickel, copper, copper chromite, platinum, palladium, or other hydrogenating catalyst under hydrogenating conditions of a superatmospheric pressure of hydrogen and elevated temperature to yield 1,2,6-hexanetriol. The reactions may be represented by the following equations:

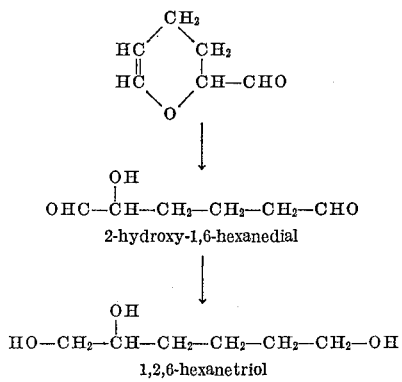

An even more direct method for preparing 1,2,6-hexanetriol is to subject the 3,4-dihydro-1,2-pyran-2-carboxaldehyde simultaneously to hydrolysis and hydrogenation, as by heating the 3,4-dihydro-1,2-pyran-2-carboxaldehyde with water or weakly acidulated water and molecular hydrogen under hydrogenating conditions, for example, at 50° to 150° C. and 100 to 5000 pounds per square inch hydrogen pressure, in the presence of a hydrogenating catalyst which may be any of those hereinbefore disclosed or their equivalents. The reactions which probably occur during the simultaneous hydrolysis and hydrogenation of the acrolein dimer appear to be as follows:

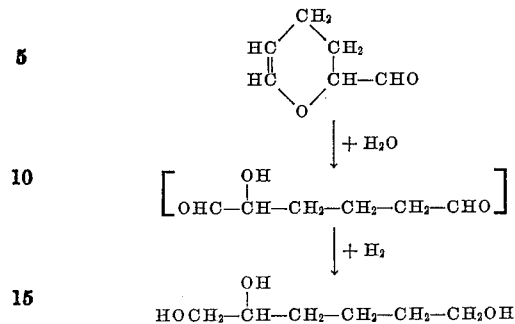

The following examples, which are not intended to be restrictive, illustrate methods for the preparation of 1,2,6-hexanetriol:

*Example I*

Propylene was partially oxidized to yield acrolein by mixing propylene with air and steam (volume ratio propylene:air:steam about 1:1.3:1.2) and passing the mixture over a cuprous oxide catalyst supported on silicon carbide porous aggregates (about 1.5% copper) at about 350° C., nominally atmospheric pressure, and for a contact time at the operating conditions of about 0.8 second. Acrolein was recovered in a yield of 85–90% upon cooling the gaseous effluent from the catalyst chamber and fractionally distilling the collected condensate. The recovered acrolein, with about 1% by weight of hydroquinone added, was passed in a continuous stream through an externally heated stainless steel tube at about 210° C. and 600–700 pounds per square inch pressure at a flow rate of about 4.2 reciprocal hours. The acrolein dimer, 3,4-dihydro-1,2-pyran-2-carboxaldehyde was recovered in a yield of 85–95% by distillation of the liquid effluent from the reaction tube. Four hundred fifty parts of the 3,4-dihydro-1,2-pyran-2-carboxaldehyde then were mixed with 1795 parts of 0.0152 N sulfuric acid and agitated for one hour at the ambient temperature. The acid was neutralized with calcium carbonate, the mixture was filtered to remove the calcium sulfate formed by the neutralization and unreacted calcium carbonate, and the filtrate was heated to 50° C. to expell $CO_2$. To this aqueous solution of 2-hydroxy-1,6-hexanedial there were added 22.5 parts of Raney nickel hydrogenating catalyst and the solution was hydrogenated by treatment with hydrogen gas under a pressure of 150–1000 p. s. i. at a maximum temperature of 150° C. By filtration and subsequent fractional distillation there was recovered a fraction of 418 parts of 1,2,6-hexanetriol distilling at 170° to 171° C. under 2–5 millimeters mercury pressure and having a refractive index ($n$ 20/D) of 1.477.

*Example II*

A second method of preparing 1,2,6-hexanetriol is shown in this example. To a quantity of 3,4-dihydro-1,2-pyran-2-carboxaldehyde there was added 0.25% by weight of aluminum isopropoxide as a solution in carbon tetrachloride containing about 0.5 gram aluminum isopropoxide per cubic centimeter of solution. The mixture was stirred and allowed to stand for about four hours with cooling as required to hold the temperature at about 35–45° C. The mixture then was fractionally distilled and 3,4-dihydro-1,2-pyran-2-methyl 3,4-dihydro-1,2-pyran-2-carboxylate was recovered as a fraction distilling at 115° to 122° C. under about 0.04 millimeter mercury pressure. The 3,4-dihydro-1,2-pyran-2-methyl 3,4-dihydro-1,2-pyran-2-carboxylate then was saponified by mixing 224 parts with a 10% w. solution of 44 parts of sodium hydroxide in water and heating the mixture for one hour on the steam bath. The mixture was allowed to stand overnight, then extracted with diethyl ether, and the extract was dried and fractionally distilled. 3,4-dihydro-1,2-pyran-2-methanol was obtained as a fraction distilling at 40° to 43° C. under 1 millimeter mercury pressure, refractive index ($n$ 20/D) 1.4772. Upon hydrolysis of 3,4-dihydro-1,2-pyran-2-methanol by heating with a dilute solution of strong mineral acid, such as $H_2SO_4$, in the manner illustrated in Example I there is obtained an aqueous solution of 5,6-dihydroxyhexanal (properties of pure 5,6-dihydroxyhexanal: B. P. 115–120° C./1 mm. Hg; refractive index ($n$ 20/D) 1.4815). Upon hydrogenation of the neutralized solution over Raney nickel catalyst, the 5,6-dihydroxyhexanal is converted to 1,2,6-hexanetriol which can be recovered by separating the catalyst from the solution and fractionally distilling.

Physical properties of 1,2,6-hexanetriol have been determined and found to be substantially as follows:

| | |
|---|---|
| Normal physical state | liquid |
| Boiling point (1 mm. Hg) | 151° C. |
| Flash point (Tag open cup) | >175° F. |
| Specific gravity ($d$ 20/4) | 1.1030 |
| Refractive index ($n$ 20/D) | 1.4766 |
| Viscosity, 20° C., centipoise | 2628 |

The volatility and hygroscopicity of 1,2,6-hexanetriol have been found to be comparable to that of glycerine, a characteristic that is of importance for use of 1,2,6-hexanetriol in applications where glycerine now is used as a humectant. Comparative figures are shown in the following table, where the test results were obtained by moistening pieces of laboratory filter paper 2 3/16 inches in diameter with about 0.3 cc. test samples of the respective compounds shown in the table, suspending the moistened papers in air at 25° C. and 50% relative humidity, and periodically weighing the papers and calculating the percentage change in net weight of the 0.3 cc. sample.

| Material Tested | Percent Change in Weight | | |
|---|---|---|---|
| | 1 Hour | 27 Hours | 330 Hours |
| 1,2,6-Hexanetriol | +5.04 | +9.1 | +11.3 |
| Glycerine | +6.06 | +16.2 | +14.9 |
| Ethylene glycol | +14.8 | +10.7 | −97.0 |
| Propylene glycol | +8.36 | −2.8 | −98.5 |

Aside from its utility as a humectant, 1,2,6-hexanetriol is of interest as a chemical intermediate. A reaction which is apparently unique to 1,2,6-hexanetriol is that by which the hydroxyls in the 2 and 6 positions can be caused to split out water with formation of tetrahydropyran-2-methanol from the 1,2,6-hexanetriol. Esters of tetrahydropyran-2-methanol, such as the acetate, propionate and butyrate, are useful as special high-boiling solvents. They can be prepared by procedures known for the preparation of esters, for example, by reaction of the tetrahydropyran-2-methanol with the appropriate acid anhydride.

The unusualness and the possible uniqueness of this reaction of 1,2,6-hexanetriol will be better understood when it is considered that even as superficially similar compounds as the series of 1,2,5-pentanetriol derivatives have been found, on the basis of extensive studies, not to undergo a comparable cyclization involving the alpha and epsilon (1,5) hydroxyls. Paul, Ann. Chim., volume 18, pages 303–394, at page 391 (1932); Chemical Abstracts 27, pages 1615–1617, at page 1617 (1933). The following examples illustrate this characteristic of 1,2,6-hexanetriol.

*Example III*

1,2,6-hexanetriol and 10% by weight of copper chromite catalyst were heated with vigouous agitation for 2.25 hours at 200 to 215° C. Tetrahydropyran-2-methanol was recovered in good yield by distillation of the resulting mixture with collection of the fraction distilling between 51° C. and 83.5° C. (except for a small forerun, between 78° C. and 83.5° C.) under 17 mm. Hg pressure; refractive index of the fraction ($n$ 20/D) 1.4600. Tetrahydropyran-2-methanol has been found to have the following properties: boiling point, 82° C. under 17 mm. Hg pressure; refractive index ($n$ 20/D) 1.4600. The acetate of tetrahydropyran-2-methanol, prepared by reaction with acetic anhydride, is a clear, colorless mobile sweet-smelling liquid distilling at 96° C. to 96.5° C. under 15 to 16 mm. Hg pressure and having a refractive index ($n$ 20/D) of 1.4440.

*Example IV*

1,2,6-hexanetriol with about 0.5% of added iodine was heated slowly to 150° C. under atmospheric pressure, the pressure then was reduced to 4 mm. mercury, and the product was distilled. Tetrahydropyran-2-methanol was recovered as the lower-boiling of the two collected fractions, boiling up to 90° C. under 4 mm. Hg pressure. Similar results were obtained when sodium bisulfate was substituted for the iodine.

As a chemical intermediate 1,2,6-hexanetriol also is useful for the preparation of alkyd resins, for which use its freedom from tendency to form undesirable decomposition products during resinification, and the excellent color of the resulting alkyds compared to otherwise similar alkyds prepared from glycerine, are noteworthy.

1,2,6-hexanetriol has been found to have the further distinctive characteristic that its ester derivatives, especially the esters with $C_5$ to $C_{15}$ monocarboxylic acids, are outstanding as improved plasticizers for resinous polymers of polymerizable ethylenic compounds, for example, polymers of vinyl chloride. In addition to imparting good flexibility, tensile strength, elasticity, and hardness interrelationships to the resinous polymers, the esters of 1,2,6-hexanetriol impart unusually good low temperature characteristics to the plasticized resin, imparting flexibility which is retained at temperatures as low as −50° to −60° C. This unexpected characteristic of 1,2,6-hexanetriol as reflected in the properties of its esters is illustrated in the following examples.

*Example V*

The esters employed either were prepared by conventional synthetic methods or (where indicated) were purchased on the market. The esters were milled into portions of commercial polyvinyl chloride (VYNW) at a loading of 50 parts per 100 parts of the polyvinyl chloride and the compositions were molded into sheets 75 mils thick. The sheets tested as follows:

(a) *Brittle points.*—Du Pont Brittleness Tester used. Test samples cooled in air and tested by impact at 2.5° C. intervals.

| Plasticizer | Brittle Point, ° C. |
|---|---|
| Tricaprylate of 1,2,6-hexanetriol | <−60 |
| Tricaproate of 1,2,6-hexanetriol | −55 |
| Tricresyl phosphate [1] | +1 |
| Bis(2-ethylhexyl) phthalate [1] | −26 |
| Butyl benzyl phthalate [1] | −15 |
| Dicapryl phthalate | −35 |

[1] Commercial plasticizer.

The excellent low-temperature characteristics of 1,2,6-hexanetriol when employed in the form of its esters was an unexpected advantage of the novel trihydric alcohol of the present invention. During and shortly before World War II the Germans manufactured a trihydric alcohol referred to as "hexanetriol" from beet sugar. The "hexanetriol," which was 1,3,5-hexanetriol, was employed in the form of its esters with $C_5$—$C_7$ fatty acids as plasticizers (Elaol 1K, I. G. Farbenindustrie) for polyvinyl chloride, such as is described in French Patent 885,854, published September 28, 1943. The French patents shows "hexanetriol" in the form of its esters with $C_5$ to $C_7$ carboxylic acids to yield a plasticized polyvinyl chloride having a brittle point of but −20° C., with which the superior results for 1,2,6-hexanetriol shown in the preceding table compare most favorably.

(b) *Other properties.*—Other properties of the compositions containing the esters of 1,2,6-hexanetriol are as follows:

|  | Tricaprylate of 1,2,6-Hexanetriol | Tricaproate of 1,2,6-Hexanetriol |
|---|---|---|
| Tensile strength, p. s. i.[1] | 2,170 | 2,050 |
| Elongation at break, percent [1] | 365 | 320 |
| 100 percent modulus, p. s. i.[1] | 940 | 790 |
| Shore "A" Hardness | 62 | 58 |
| Stiffness in flexure, p. s. i.[2] | 1,000 | 880 |
| Volatility of plasticizer [3] | 0.1 | 0.6 |
| Heat stability: |  |  |
| color [4] | good | good |
| flexibility [4] | good | good |

[1] ASTM Method D412-41 (Die C), each result the average from four test pieces.
[2] Olsen Stiffness Tester of one-half inch pound capacity according to ASTM Method D747-34T.
[3] Values relative to "DOP," commercial bis(2-ethylhexyl) phthalate plasticizer, determined from weight loss of molded circular test discs 2″ x .045″ upon heating at 100° C. for 100 hours.
[4] From observation of test discs in test (3).

It will be appreciated that utility of 1,2,6-hexanetriol and its compounds is not restricted to the uses disclosed herein and it further will be appreciated that the methods of preparing 1,2,6-hexanetriol disclosed herein are susceptible of specific modification without departure from the letter and spirit of the claimed invention.

We claim as our invention:
1. 1,2,6-hexanetriol.
2. A process for the preparation of 1,2,6-hexanetriol which comprises hydrogenating in the presence of a hydrogenation catalyst and under hydrogenating conditions of superatmospheric pressure of hydrogen and elevated temperature an aqueous solution produced by hydrolysis of acrolein dimer under neutral to acidic conditions of the aqueous hydrolysis mixture.
3. A process for the preparation of 1,2,6-hexanetriol which comprises hydrogenating in the presence of a hydrogenation catalyst and under hydrogenating conditions of superatmospheric pressure of hydrogen and elevated temperature an aqueous solution produced by hydrolysis of 3,4-dihydro-1,2-pyran-2-methanol under neutral to acidic conditions of the aqueous hydrolysis mixture.

References Cited in the file of this patent

UNITED STATES PATENTS

| 2,097,493 | Lueck | Nov. 2, 1937 |
| 2,585,884 | Whetstone et al. | Feb. 12, 1952 |
| 2,639,297 | Whetstone et al. | May 19, 1953 |

FOREIGN PATENTS

| 606,564 | Great Britain | Aug. 17, 1948 |

OTHER REFERENCES

Beilstein Handbuch der Organischen Chemie, vol. I, page 521, 1918 edition.

Schulz et al.: Angewandte Chemie, vol. 62, 1950, pgs. 105, 110 and 111.